(No Model.) 2 Sheets—Sheet 1.

E. W. LUCE.
STOVE FOR HEATING RAILWAY CARS.

No. 386,330. Patented July 17, 1888.

WITNESSES:
C. Neveux.
C. Sedgwick.

INVENTOR:
E. W. Luce

BY Munn & Co.
ATTORNEYS.

(No Model.) 2 Sheets—Sheet 2.
E. W. LUCE.
STOVE FOR HEATING RAILWAY CARS.
No. 386,330. Patented July 17, 1888.
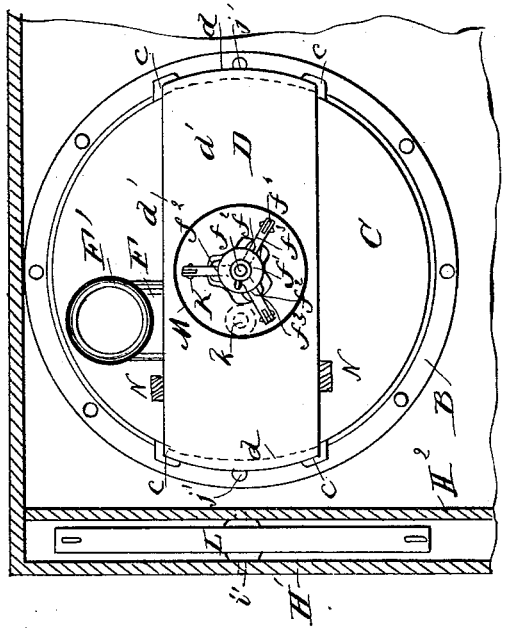
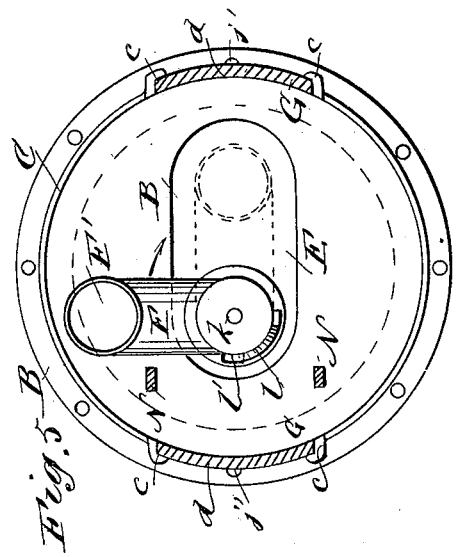
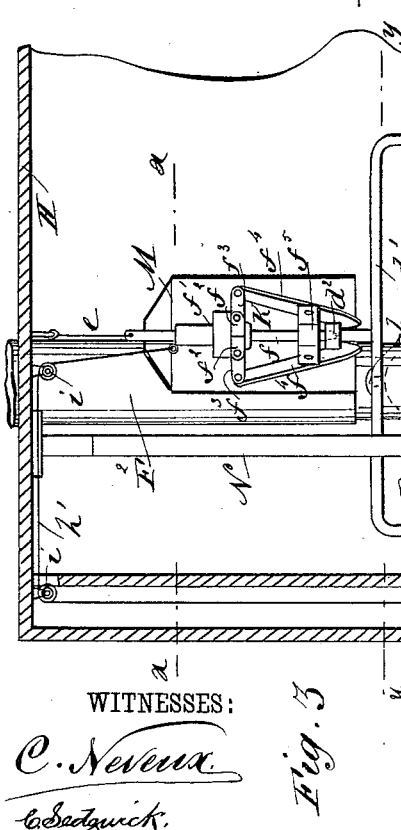
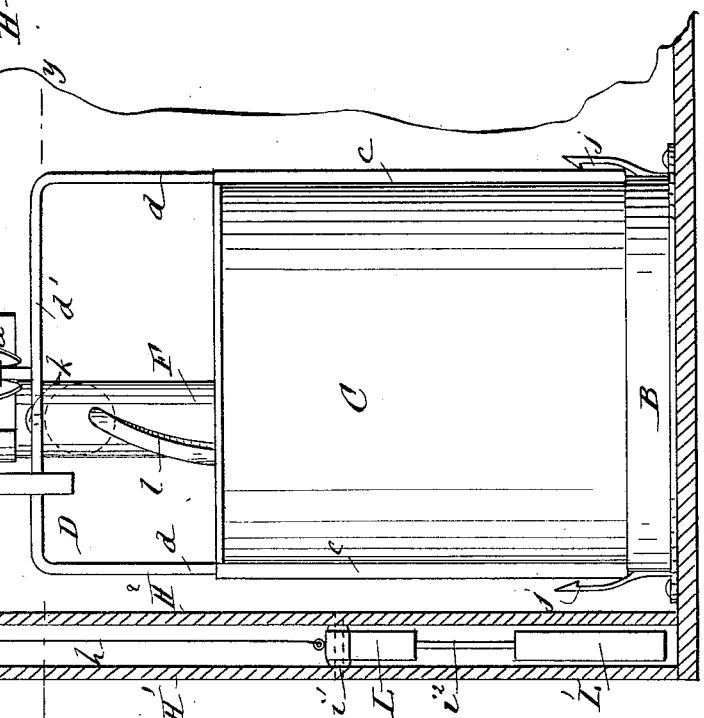
WITNESSES:
C. Neveux
C. Sedgwick.
INVENTOR:
E. W. Luce
BY Munn & Co
ATTORNEYS.

UNITED STATES PATENT OFFICE.

EDWIN W. LUCE, OF BOLIVAR, NEW YORK.

STOVE FOR HEATING RAILWAY-CARS.

SPECIFICATION forming part of Letters Patent No. 386,330, dated July 17, 1888.

Application filed March 21, 1887. Serial No. 231,690. (No model.)

*To all whom it may concern:*

Be it known that I, EDWIN W. LUCE, of Bolivar, in the county of Allegany and State of New York, have invented a new and useful Improvement in Stoves for Heating Railway-Cars, of which the following is a full, clear, and exact description.

Reference is to be had to the accompanying drawings, forming a part of this specification, in which similar letters of reference indicate corresponding parts in all the figures.

Figure 2:
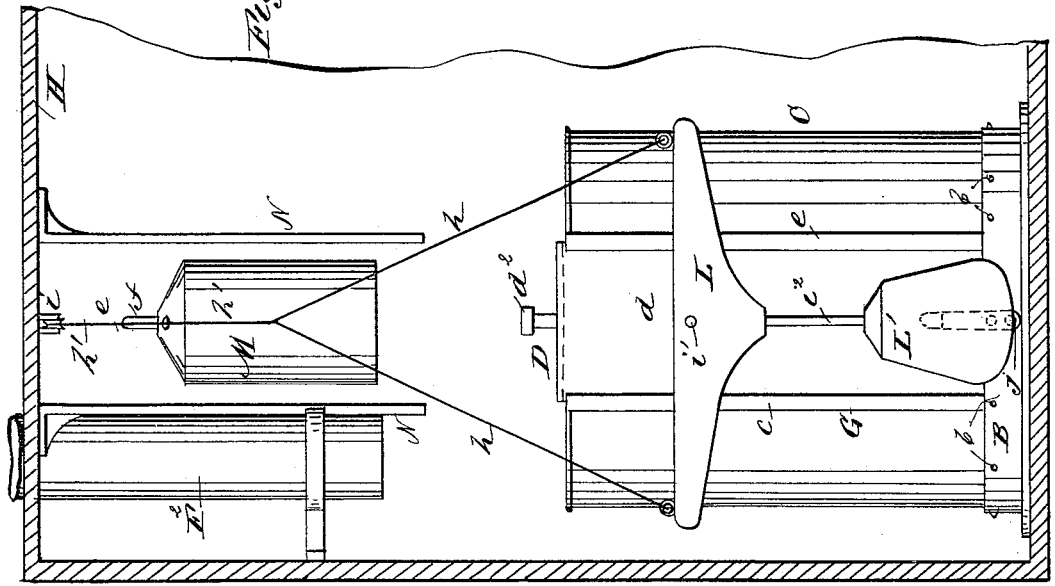
Figure 1:
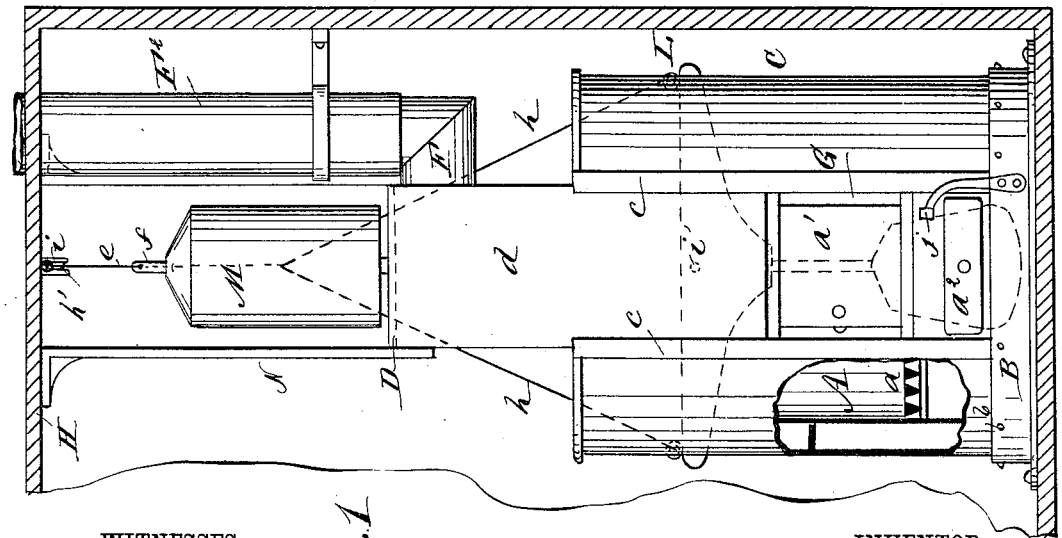

Figure 1 is a broken front elevation of my new stove, showing a portion of the walls and floor of a car in section and showing the "drop-section" of the stove-casing in elevated position. Fig. 2 is a reverse view showing the drop-section in closed position. Fig. 3 is a sectional elevation showing one side of the stove and one end of the car, the drop-section being shown in elevated position. Fig. 4 is a sectional plan view taken on the line $x$ $x$ of Fig. 3, and Fig. 5 is a similar view taken on the line $y$ $y$ of Fig. 3.

The invention will first be described in connection with the drawings, and then pointed out in the claims.

A represents the fire-pot of the stove, provided with the grate-bars $a$ and door $a'$, as shown in Fig. 1. The fire-pot is inclosed by a casing composed of the base-casting B, the cylinder C, and the drop-section D. The cylinder C is made fast at its lower ends by the rivets or bolts $b$ to the base B, and an oblong opening, E, is formed in the top of the cylinder for the passage of the pipe and elbow F F', and in the sides of the cylinder are formed the openings G, which reach down below the door $a'$ and the ash-box $a^2$ of the fire-pot, as shown clearly in Fig. 1. Along the edges of the openings G are formed the flanges $c$ $c$, which receive between them and hold in place the side pieces, $d$ $d$, of the drop-section D. The side pieces, $d$ $d$, are of a size to wholly close the openings G when said drop-section D is dropped to the position shown in Fig. 2, and when in this position the top piece, $d'$, closes the opening E at the top of the cylinder C, so that no fire can escape from the stove.

The section D is held in elevated position, as shown in Figs. 1 and 3, by a grapple, K, engaging with the headed stud $d^2$, projecting upward from the center of the cross-piece $d'$ of the said drop-section D. The grapple K is suspended from the top H of the car by a suspending cord or wire, $e$, attached to the spindle $f$ of the grapple. On this spindle is placed loosely the sleeve $f'$, formed with three short rigid arms, $f^2$. To these are hinged the links $f^3$, which are themselves hinged to the upper ends of the hooks $f^4$, pivoted in the frame $f^5$, rigidly secured to the lower end of the spindle $f$. The hooks $f^4$ are adapted to engage with the headed stud $d^2$, as shown in Fig. 3, for holding the drop-section D in elevated position. The sleeve $f'$ is connected to the ends of the centrally-pivoted arm L, by the rods or cords $h$ $h$ and the wire or cord $h'$, connected to the cords $h$ and passed over the pulleys $i$ at the top of the car, as shown in Fig. 3. The arm L is located between the two front walls, H' H², of the car and is counterpoised upon its pivot $i'$ by the heavy pendulum-like weight L', attached to the arm L below the pivot by the rod $i^2$, so that any swinging of the weight L' will rock the arm L on its pivot and draw more or less upon the cords or wires $h$ $h'$. In case of accident and the car tipping over or considerably to one side the weight L' will operate the arm L to such an extent as to cause the cords or wires $h$ $h'$ to lift the sleeve $f'$ upward upon the spindle $f$. This movement will cause the links $f^3$ to draw inward the upper ends of the hooks $f^4$ and cause their lower ends to release the stud $d^2$, whereupon the section D will instantly drop and close the stove and prevent all escape of fire. The section D, when permitted to drop to closed position, is locked by spring-catches $j$, engaging with suitable lugs $j'$ upon the side pieces, $d$, of the said section, so that even if the stove be wholly upset or turned upside down no fire can escape.

The pipe and elbow F F' is made fast and pivoted to the top of the drop-section by rivet $k$, and the pipe F is provided at one side with a spiral flange, $l$, which fits loosely in a groove, $l'$, made in the top of the cylinder C, which is stationary. When the section D drops, the elbow will first be detached from the permanent pipe F² by a direct downward movement, and then turned by the spiral $l$ to a position in line with the opening E in the top of the cylinder C, as shown in dotted lines in Fig. 5. This turning of the said pipe and elbow is effected by the spiral flange $l$, entering the groove $l'$ in the stationary top of the cylinder, so that when the drop-section D reaches the limit of its downward motion it not only closes the stove, but also wholly incloses the pipe and elbow F F'.

To prevent the grapple K from being meddled with I inclose it with a casing, M, as shown clearly in Figs. 1, 2, and 3.

N N represent stays to prevent the section D when elevated from turning axially.

By placing the cords $h$ and the arm L and weight L' at the end of the car and between the sheathing and wall, as shown, said parts are completely concealed, and in case of collision and the breaking through of the end of the car the cords $h$ must necessarily be displaced, which will cause the dropping of the section D and the consequent closing of the stove.

Having thus described my invention, what I claim as new, and desire to secure by Letters Patent, is—

1. The cylinder C, formed with the top opening, E, and side openings, G, and the drop section D, formed with the side piece, $d$, top cross-piece, $d'$, and knob $d^2$, in combination with the grapple K, cords for elevating the same passed along the top and end of the car, the pivoted and weighted bar L, and the cords for connecting the same to the cord for elevating the grapple, substantially as described.

2. The cylinder C, having side and top openings, and the drop-section formed with side pieces, $d$, and top cross-piece, $d'$, and knob $d^2$, and an elevated grapple for elevating the drop-section, in combination with the pipe and elbow F F', pivoted to the top cross-piece, $d'$, and provided with the spiral flange $l$, fitted in the slot $l'$, formed in the top of the cylinder C, substantially as and for the purposes described.

EDWIN W. LUCE.

Witnesses:
H. A. WEST,
C. SEDGWICK.